Oct. 9, 1923.                                                            1,469,959
                         G. A. RICHTER ET AL
          COOLING AND ABSORBING SYSTEM FOR SULPHUR DIOXIDE
                         Filed Aug. 28, 1920
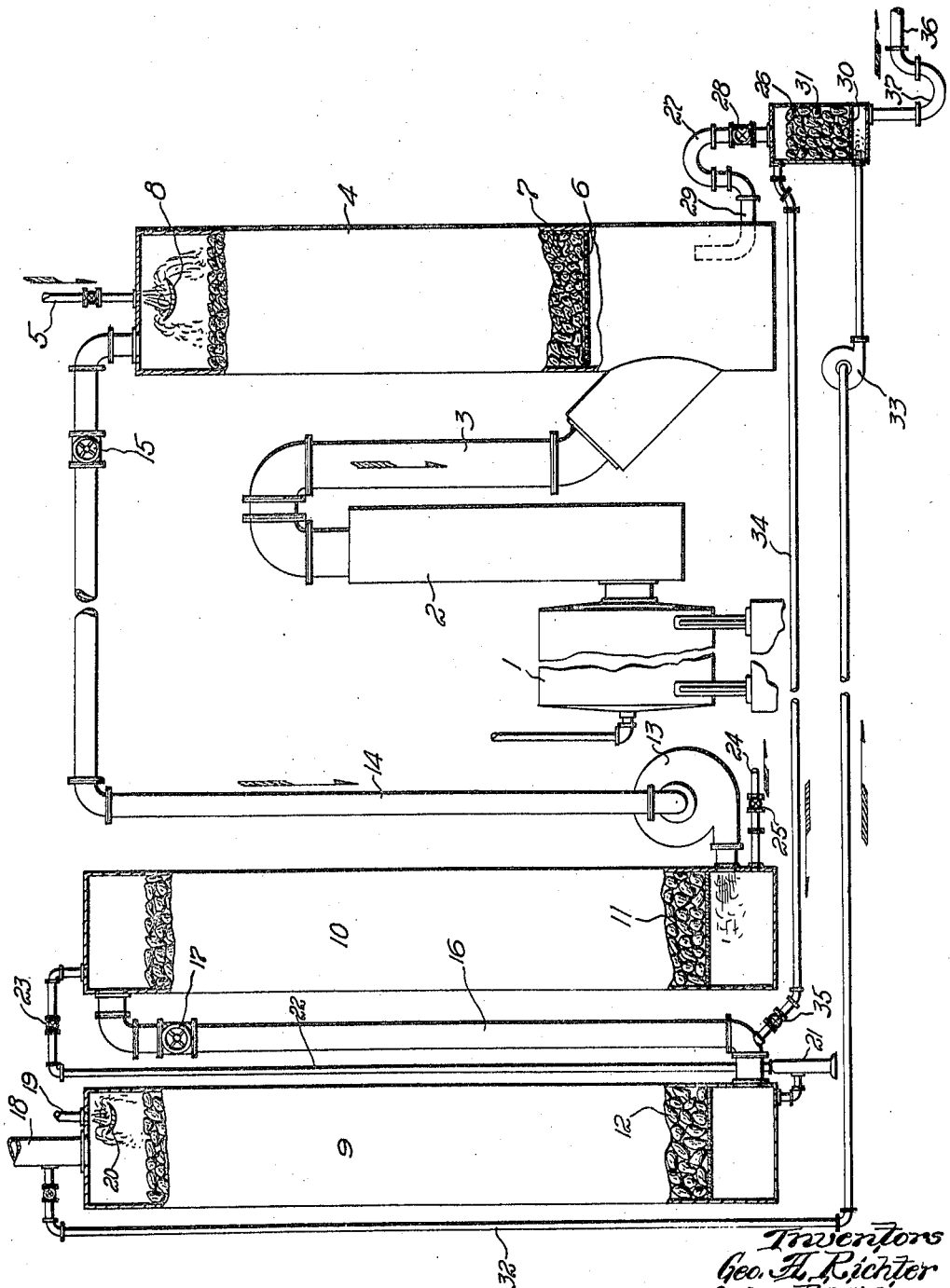

Patented Oct. 9, 1923.

1,469,959

UNITED STATES PATENT OFFICE.

GEORGE A. RICHTER AND GORDON E. WIGHTMAN, OF BERLIN, NEW HAMPSHIRE, ASSIGNORS TO BROWN COMPANY, OF BERLIN, NEW HAMPSHIRE, A CORPORATION OF MAINE.

COOLING AND ABSORBING SYSTEM FOR SULPHUR DIOXIDE.

Application filed August 28, 1920. Serial No. 406,645.

*To all whom it may concern:*

Be it known that we, GEORGE A. RICHTER and GORDON E. WIGHTMAN, citizens of the United States, residing at Berlin, in the county of Coos and State of New Hampshire, respectively, have invented new and useful Improvements in Cooling and Absorbing Systems for Sulphur Dioxide, of which the following is a specification.

This invention has relation to the treatment of gases delivered from a sulphur burner, for cooling them and recovering sulphur dioxide therefrom. The products of combustion from such burners comprise nitrogen, sulphur dioxide, a relatively small proportion of oxygen, and small amounts of other gases; and the object of the present invention is to provide a process for the recovery of sulphur dioxide without appreciable loss, and to provide an apparatus for accomplishing this which is simple, durable, inexpensive, and not likely to get out of order or require repairs.

On the accompanying drawing, we have illustrated more or less conventionally or diagrammatically an apparatus embodying and for practicing our invention.

It will be understood that, while we shall describe the apparatus and the process in connection with the manufacture of acid liquor for use in the manufacture of sulphite pulp, they may be employed for other purposes, although, as hereinafter pointed out, they are especially applicable for the sulphite-pulp industry, and are capable of effecting marked economies in the production of the sulphite cooking liquor.

Proceeding first to a brief description of the various instrumentalities which are comprised by the apparatus shown on the drawing,—a sulphur burner is indicated at 1, and the gases pass therefrom through the combustion chamber 2 and the conduit 3 to the lower end of a cooling tower 4, through which cooling water is caused to pass in counter direction to the passage of the gas. River water at seasonable temperatures, or artificially chilled if desired, is delivered to the top of the tower by a pipe 5. This water may be sprayed through the ascending gases, although we prefer to bring the gases and the cooling medium in contact by passing them in counter-current flow through a mass of inert interstitial surface material in the tower, such as spiral brick, loose rocks, etc., by which the water and the gases are caused to flow through numerous tortuous passages. We have therefore illustrated the tower as having a transverse grid or perforated partition 6, on which rests a mass of the inert interstitial surface material conventionally indicated at 7. The delivery end of the water pipe 5 is provided with a spray head or distributer 8. At 9 and 10 are two absorption towers connected in series, in which are contained fragments 11, 12, of limestone, dolomite or other calcium (or magnesium) bearing material with which sulphur dioxide may combine for the formation of a cooking acid liquor such as calcium bisulphite with more or less free sulphurous acid. From the top of the cooling tower 4, the gases are drawn by a pump 13 through conduit 14 (valved at 15) and delivered to the bottom of absorption tower 10. A conduit 16, having a valve 17, conducts the unabsorbed gases from the top of tower 10 to the lower end of tower 9, and the tail gas (nitrogen, some oxygen, and a small quantity of sulphur dioxide which was unabsorbed) is delivered through a conduit 18 to the atmosphere. Water is delivered to the top of tower 9 through a pipe 19 and nozzle or distributer 20. From the bottom of tower 9, the acid liquor is pumped by a pump 21 through a pipe 22 having a valve 23 to the top of tower 10, where it meets the strongest gas, and the strong raw acid liquor is conducted by pipe 24 (valved as at 25) to a storage tank (not shown) for subsequent use in the digesters. As thus far described, instrumentalities comprising the absorption system do not differ except in detail from those heretofore used, except in the construction of the cooling tower 4, arranged to cause a direct contact of the cooling water with the hot burner gases.

Below the cooling tower, there is an auxiliary or recovery tank 26 to which the hot dilute liquor from said tower (containing $SO_2$ and impurities washed from the products of combustion) is delivered by a pipe 27 having a valve 28, and formed with a trap 29, the vertical inner end of which serves as an overflow pipe for the pool of liquor which forms in the bottom of the cooling tower. This recovery tank 26 has a perforated partition 30, on which rests a mass of inert interstitial surface material 31 (e. g. spiral brick, fragments of rock or the like), so that the liquor, in passing through the mass, will be broken up into innumerable small streams. A pipe 32 communicates at one end with the tail gas pipe 18, and at its other end at the lower end of the recovery tank with a pump 33 (preferably made of lead) intermediate its ends, so that tail gas will be drawn from the pipe 18 and caused to flow through the tank in counter-current to the cooling water delivered from the tower 4. A pipe 34, having a valve 35, leads from the upper portion of the recovery tank to an elbow in the gas pipe or conduit leading from absorption tower 10 to that at 9. A waste pipe 36, trapped as at 37, conducts away the tail water from the recovery tank.

In operation, the flow of water through the gas-cooling tower 4 is preferably so regulated that the liquid leaving the bottom of the tower has a temperature of about 130° to 190° F., and consequently contains from about .2% to about .7% sulphur dioxide dissolved therein according to its temperature. The cooled gases pass from the cooling tower through the two absorption towers in series, and the sulphur dioxide is absorbed or combined to such extent that the tail gas consists of nitrogen, about 5% oxygen, and from 0% to 1% sulphur dioxide, depending upon the regulation of the flow of liquid through the absorption towers. From the tail gas, issuing from the tower 9, a portion thereof (e. g. about 10%) is pumped through the recovery tank in counterflow to the tail liquor from the cooling tower. In practice, using a 4-inch lead fan or pump, the tail gas is delivered to the recovery tank at the rate of, say, 100 to 400 cubic feet per minute. In passing through the recovery tank, it picks up, as it were, sulphur dioxide, and leaves the tank augmented or enriched with a sulphur dioxide content, ranging in toto from 1% to 8%, depending upon the volumes circulated. This sulphur dioxide gas is now preferably delivered to the absorption system at a point between the two towers, where the burner gas ranges normally from 1% to 6% $SO_2$, so that the introduction of this fairly rich, augmented and enriched tail gas does not interfere with ordinary conditions. The augmented or enriched tail gas may range in temperature from 100° to 150° F., but, inasmuch as its volume is approximately only about 10% of the total volume of burner gases passing through the acid or absorption system, it will have little effect in the second tower of the system.

If desired, the gas from the recovery tank 26 may be cooled before being delivered to the absorption tower. The hot liquor, delivered from the cooling tower, is reduced in $SO_2$ content to a percentage varying from .02% to .1% by the passage of the tail gas therethrough, and hence the tail water may be sent either to waste or for use in some other part of the plant where a slightly acid water is not objectionable.

In ordinary practice, in a mill producing about 150 tons of sulphite pulp daily, water may be passed through the cooling tower to the delivery tank at a rate of 60 to 120 gallons per minute. With the recovery tank in operation, the sulphur losses are negligible and total less than the ordinary loss through the indirect cooling systems heretofore employed.

In the system herein described, a decided advantage is secured by the use of the tail gas for passage through the recovery tank, instead of employing atmospheric air, in that the atmosphere contains about 20% oxygen, which has a tendency to oxidize the sulphur dioxide to sulphuric acid, whereas, by using the tail gas from the absorption towers, a relatively small proportion of oxygen is present, and the loss by oxidation is decreased or prevented.

It will, of course, be understood that, instead of withdrawing the tail gas from the outlet of the second acid or absorption tower, it may be drawn from the first tower 10, provided the gas delivered to the recovery tank contains less $SO_2$ than is realized at the gas exit from the tank. Since the invention includes broadly the cooling of the burner gas by direct contact with water, and the recovery of the $SO_2$ absorbed by such water, we should not regard it as a departure from the spirit and scope of our invention were such gas to be recovered from the tail water by a vacuum pump or otherwise, instead of passing tail gas therethrough, especially where a gas, rich in $SO_2$, is desired. It will further be understood that, instead of the two acid towers as shown, we may employ a tower or tank in which milk of lime is used, and in such case, the tail gas for de-acidifying the tail water from the cooler may be taken from any convenient point.

In addition to the advantages of our system to which reference has already been made, we may call attention to the following: Our system, by reason of the cooling of the gases by direct contact with water through the mass of interstitial material, permits the use of clean river water, and thus avoids the chance of plugging spray nozzles due to inefficient circulation of cooling water. The river water temperature is always less than the temperature that can be obtained by an indirect cooling of spray water, and consequently the exit gas from the cooler can be brought to a lower temperature. Furthermore our system eliminates filtration of the hot dilute $SO_2$ solution from the cooler to remove the sulphur since the sulphur impurities are collected in the water, eliminates at least two acid pumps which are ordinarily employed and which operate under severe conditions, avoids the accumulation of sulphuric acid in the cooling tower inasmuch as the sulphates and other impurities removed by the cooling water are not delivered to the tower, and allows greater changes in capacity than heretofore, without material loss of sulphur or readjustment of apparatus.

What we claim is:—

1. The herein described process of treating hot sulphur burner gases, which comprises passing such hot gases and cold water in contact in counter-current flow through a confined space to cool such gases, passing such cooled gases through an absorbing medium to recover sulphur dioxide therefrom, passing a gas through the water employed in cooling said hot burner gases to recover sulphur-dioxide therefrom, and mixing such recovered gases with the cooled gases.

2. The herein described process of treating hot sulphur burner gases, which comprises passing such hot gases and cold water in contact in counter-current flow through a confined space to cool such gases, passing such cooled gases through an absorbing medium to recover sulphur dioxide therefrom, recovering such sulphur dioxide as may be absorbed by the water employed in cooling said hot burner gases, and delivering the recovered gas to said absorbing medium.

3. The herein described process of treating sulphur burner gases, which comprises passing such gases and cold water in contact in counter-current flow through a confined space to cool such gases, passing the cooled gases through an absorbing medium to recover sulphur dioxide therefrom, and passing more or less of the tail or unabsorbed gases through the heated water for removing sulphur dioxide absorbed thereby.

4. The herein described process of treating sulphur burner gases, which comprises passing such gases and cold water in contact in counter-current flow through a confined space to cool such gases, passing the cooled gases through an absorbing medium to recover sulphur dioxide therefrom, passing more or less of the tail or unabsorbed gases through the heated water for removing sulphur dioxide absorbed thereby, and returning the enriched tail gases to the absorbing medium.

5. The herein described process of treating sulphur burner gases, which comprises passing such gases and cold water in contact in counter-current flow through a confined space to cool such gases, passing the cooled gases through an absorbing medium to recover sulphur dioxide therefrom, and passing in direct contact in counter-current flow the heated cooling water and more or less of the tail gases to remove sulphur dioxide absorbed by the cooling water.

6. The herein described process of treating sulphur burner gases, which comprises passing such gases and cold water in contact in counter-current flow through a confined space to cool such gases, passing the cooled gases through an absorbing medium to recover sulphur dioxide therefrom, passing in direct contact in counter-current flow the heated cooling water and more or less of the tail gases to remove sulphur dioxide absorbed by the cooling water, and returning the enriched tail gases to the absorbing medium.

7. The herein described process of treating sulphur burner gases, which comprises passing such gases and cold water in contact in counter-current flow through a confined space to cool such gases, passing the cooled gases through a plurality of towers, in series, each containing a medium for absorbing sulphur dioxide, passing more or less of the unabsorbed or tail gases through the heated cooling water to remove sulphur dioxide absorbed thereby, and delivering the enriched tail gases to one of said towers for recovery of the sulphur dioxide from such tail gases.

8. The herein described process of treating sulphur burner gases, which comprises passing such gases and cold water in contact in counter-current flow through a confined space to cool such gases, passing the cooled gases through an absorbing medium to recover sulphur dioxide therefrom, passing more or less of the tail gas and the heated cooling water in contact and in counter-current flow through a mass of inert interstitial surface material, and recovering sulphur dioxide from the enriched tail gases.

9. The herein described process for recovering sulphur dioxide from water employed in cooling sulphur burner gases, which comprises passing such water through a mass of inert interstitial material and passing tail gases from a sulphur-dioxide-absorbing system in counter-flow through said mass in contact with said water.

10. The herein described process which comprises passing the products of combustion of a sulphur burner and cold water in contact and in counter-current flow through a cooling tower, passing the cooled gases through a series of absorbing towers, passing the heated cooling water and unabsorbed tail gases from the absorbing towers in contact and in counter-current flow to remove the sulphur dioxide absorbed by said cooling water, and returning the tail gas, enriched with sulphur dioxide, to the cooler burner gases at a point between said absorbing towers where such gas is relatively weak in sulphur dioxide.

11. The process of treating hot sulphur burner gases, which comprises passing the gases and water in counter-current flow through a confined space to cool such gas by contact with water, absorbing sulphur dioxide from the gases passing from said space, recovering from the heated water flowing from such space such sulphur dioxide as may be absorbed thereby, and mixing such recovered gas with the cooled gas.

12. In a gas cooling and absorbing system, in combination, a gas cooling tower, a sulphur burner, means for delivering the gases from said burner to the lower portion of said tower, means for delivering cooling water to the top of said tower to flow in contact and in counter direction to said gases, a recovery tank communicating with the lower end of said cooling tower to receive the heated cooling water, an absorbing system for absorbing sulphur dioxide from said cooled gases, and means for passing unabsorbed tail gas from said absorbing system through said recovery tank in contact with said heated water.

13. In a gas cooling and absorbing system, in combination, a gas cooling tower, a sulphur burner, means for delivering the gases from said sulphur burner to the lower portion of said tower, means for delivering a cooling medium to the top of said tower to flow in contact and in counter direction to said gases, a recovery tank communicating with said cooling tower to receive the heated cooling water, an absorbing system for absorbing sulphur dioxide from said cooled gases, including absorbing towers connected in series and means for conducting said cooled gases to the first of said towers, a conduit and a pump for conducting tail gases from the second of said towers through said recovery tank in contact with the heated cooling water to recover sulphur dioxide therefrom, and a conduit for conducting the enriched tail gases from said recovery tank to the second of said towers.

In testimony whereof we have affixed our signatures.

GEORGE A. RICHTER.
GORDON E. WIGHTMAN.